A. McKENNEY.

Railroad Rails.

No. 5,307. Reissued March 4, 1873.

Witness:
Jas. E. Hutchinson
C. L. Everett.

Inventor.
Ameron McKenney
per
Alexander Mason
Attorneys.

AM. PHOTO-LITHOGRAPHIC CO. N.Y. (OSBORNE'S PROCESS)

UNITED STATES PATENT OFFICE.

ALMERON McKENNEY, OF MAUMEE CITY, OHIO.

IMPROVEMENT IN RAILROAD RAILS.

Specification forming part of Letters Patent No. 116,975, dated July 11, 1871; reissue No. 5,307, dated March 4, 1873.

DIVISION A.

*To all whom it may concern:*

Be it known that I, ALMERON McKENNEY, of Maumee City, in the county of Lucas and in the State of Ohio, have invented certain new and useful Improvements in Railroad Rails; and do hereby declare that the following is a full, clear, and exact description thereof, reference being had to the accompanying drawing and to the letters of reference marked thereon making a part of this specification.

The nature of my improvement consists in the construction of a railroad rail in two parts —a lower or foot rail in the form of an arch, or the bridge variety, having a single-flanged base, to be made of iron; and an upper part, made also in the form of an arch, which forms the tread or wearing-surface, to be made of steel—each part fitting together like a tongue and groove, forming a continuous rail.

The several objects to be gained are, first, to make a continuous rail of sufficient strength in all parts; second, to secure a permanent base, to remain for a long time, and an upper or wearing part of steel, to be removed from time to time, as it may be required; and, third, to secure a sufficient diameter and breadth of base without a material increase in weight.

Figure 1:
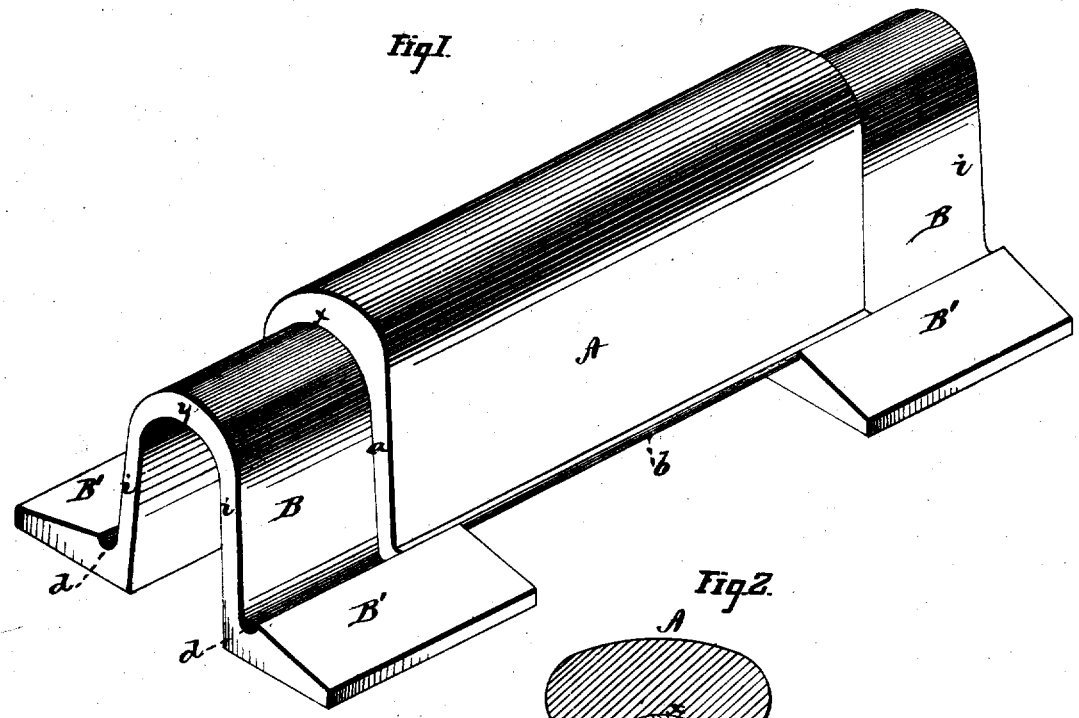
Figure 2:
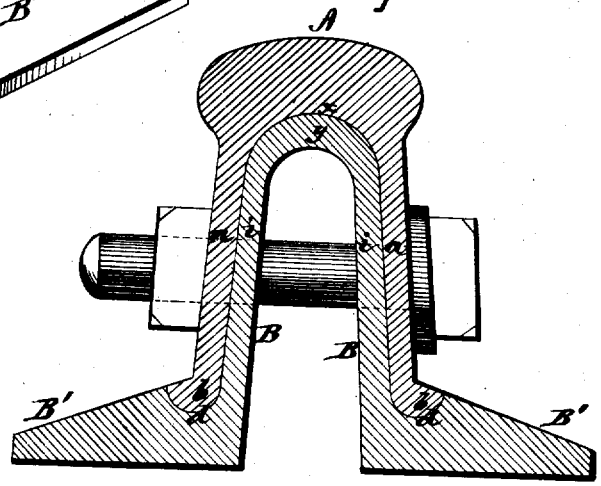

Figure 1 in the drawing represents a perspective view of the two parts of the rail, and Fig. 2 represents a sectional view of the same.

A in the drawing represents the outer rail, *f* being the arch and *a a* the sides of the arch of this rail. B represents the inner rail, *y* being the arch and *i i* the sides of the arch of this rail. B′ B′ represent the base of the two rails, and which is a part of the inner rail B. Between the inner part of each base-piece B′, on the upper surface, and the lower extremities of the sides *i i* of the rail B, is a groove, *d d*, which extends the entire length on each side of the rail. Upon the lower extremities of each side piece *a* of the outer rail A is formed a tongue, *b*, of a shape to neatly fit into the grooves of the inner rail so when the two are put together the outer rail fits snugly over the inner one, as shown. In Fig. 2 it may be seen that the sides of the arch are not parallel or do not stand plumb with the base B′, but stand a little bracing, thereby giving the greatest strength, and not being liable either to collapse or to press outwardly, and the parts being secured by lateral screw-bolts passing through, afford altogether ample strength for the sides for a heavy rail. In Fig. 2, also, it will be seen that the flanged base B′ B′, being made heavy and broad and resting perfectly level upon the ties, must afford a firm foundation on which all may remain permanently and with ample security against rocking or lateral sway.

By this construction the weight upon the rail is equally distributed upon the top of the inner arch and upon the foot-pieces of the outer arch and their bearings upon the base, thus affording a structure of great strength.

It will be observed that the upper part of the inner arch is made heavier than the sides of the same, which is to give greater strength where the ends of the head-rail meet, thus distributing the weight of metal to points where it is most needed.

The head of the rail may be made to project more or less beyond the sides of the arch, according to the curves of the road. If a road has many short curves, the projection forms a wearing-surface for the flanges of the wheel to save the rapid destruction of the rail. On a road of but few or of easy curves, the rail should be made near the form of an inverted U, or straight on the sides.

For the purpose of economizing the metal and cost of the rail, the inner rails B B′ need not be placed end to end, but may be distributed at suitable intervals, and the outer rails be so placed that their extremities only rest upon the inner rails, as shown in Fig. 1. This mode of using the rails may be adopted, or the inner rails may meet at each end, and the outer rails be so placed upon them that the joints of the inner rails are thereby broken. In either instance the two rails should be secured together and in position by lateral bolts.

What I claim is—

A compound rail for railroads, consisting of the hollow arched base-rail B, provided with an outward flange on each side, grooved the entire length of each flange at the lower sides of the arch-walls *i i*, in combination with the exterior cap-rail A, overlapping the top and entire sides of the base-rail, with its extremities fitting into the grooves in the same and secured by lateral bolts, all substantially as and for the purpose set forth.

In testimony that I claim the foregoing I have hereunto set my hand this 13th day of January, 1873.

ALMERON McKENNEY.

Witnesses:
C. L. EVERT,
A. N. MARR.